United States Patent
Han et al.

(10) Patent No.: US 9,665,221 B2
(45) Date of Patent: May 30, 2017

(54) TOUCH SENSING SYSTEM

(71) Applicant: LG Display Co., Ltd., Seoul (KR)

(72) Inventors: Sungsu Han, Gyeonggi-do (KR); Seongkyu Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 106 days.

(21) Appl. No.: 14/482,127

(22) Filed: Sep. 10, 2014

(65) Prior Publication Data

US 2015/0185914 A1     Jul. 2, 2015

(30) Foreign Application Priority Data

Dec. 31, 2013    (KR) .......................... 10-2013-0168579

(51) Int. Cl.
*G06F 3/044*       (2006.01)
*G06F 3/041*       (2006.01)

(52) U.S. Cl.
CPC ............ *G06F 3/044* (2013.01); *G06F 3/0412* (2013.01); *G06F 3/0416* (2013.01); *G06F 2203/04111* (2013.01)

(58) Field of Classification Search
USPC .................................................. 345/173–175
See application file for complete search history.

(56) References Cited

U.S. PATENT DOCUMENTS

| 8,350,824 | B2 | 1/2013 | Hung et al. |
| 2013/0278525 | A1 | 10/2013 | Lim et al. |
| 2014/0132541 | A1* | 5/2014 | Miyamoto ............... G06F 3/041 345/173 |
| 2015/0062040 | A1* | 3/2015 | Park ...................... G06F 3/0416 345/173 |

* cited by examiner

*Primary Examiner* — Carolyn R Edwards
*Assistant Examiner* — Deeprose Subedi
(74) *Attorney, Agent, or Firm* — Morgan, Lewis & Bockius LLP (57) ABSTRACT

A touch sensing system includes a touch screen including touch sensors and sensing lines, the touch sensors and the sensing lines being divided into first and second sensing areas, a first touch sensing integrated circuit (IC) sensing a touch input of the first sensing area using a signal received through receiving channels, a second touch sensing IC sensing a touch input of the second sensing area using a signal received through receiving channels separated from the receiving channels of the first touch sensing IC, differential amplifiers between the sensing lines and the receiving channels of the first and second touch sensing ICs, and a switch connecting a sensing line, which is closest to the first sensing area among the sensing lines of the second sensing area, to an Nth differential amplifier connected to a last receiving channel of the first touch sensing IC.

15 Claims, 9 Drawing Sheets

FIG. 1

(RELATED ART)

FIG. 2

(RELATED ART)

FIG. 3

(RELATED ART)

TOUCH SENSING SYSTEM

This application claims the benefit of Korean Patent Application No. 10-2013-0168579 filed on Dec. 31, 2013, the entire contents of which is incorporated herein by reference for all purposes as if fully set forth herein.

BACKGROUND OF THE INVENTION

Field of the Invention

The present invention relates to a touch sensing system, and more particularly, to a touch sensing system for division-driving a touch screen using a plurality of touch sensing integrated circuits (ICs).

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been indispensably adopted in portable information appliances. The touch UI is implemented through a method for forming a touch screen on the screen of a display device.

Figure 1:
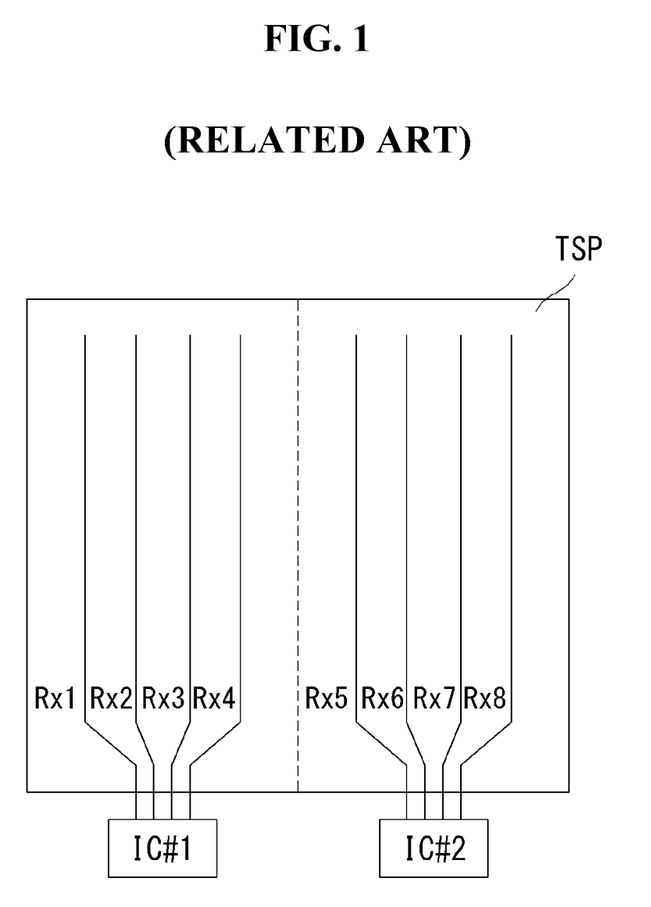
FIG. 1 shows an example of connecting a plurality of touch sensing integrated circuits (ICs) to a touch screen.
Figure 2:
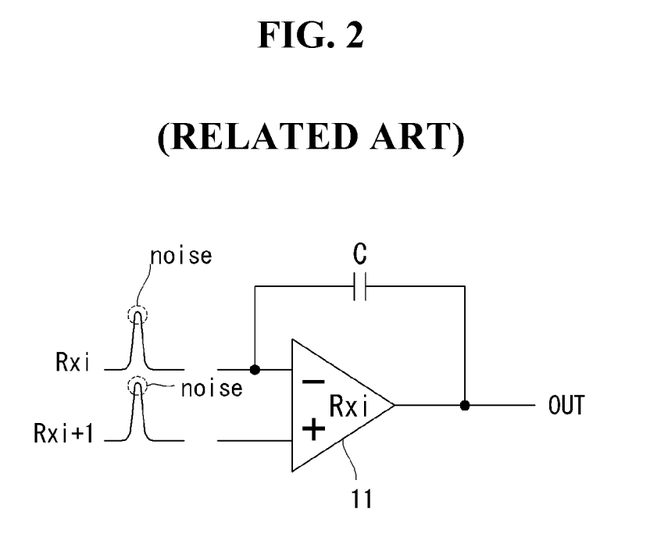
FIG. 2 shows a differential amplifier connected to Rx channels of a touch sensing IC.
Figure 3:
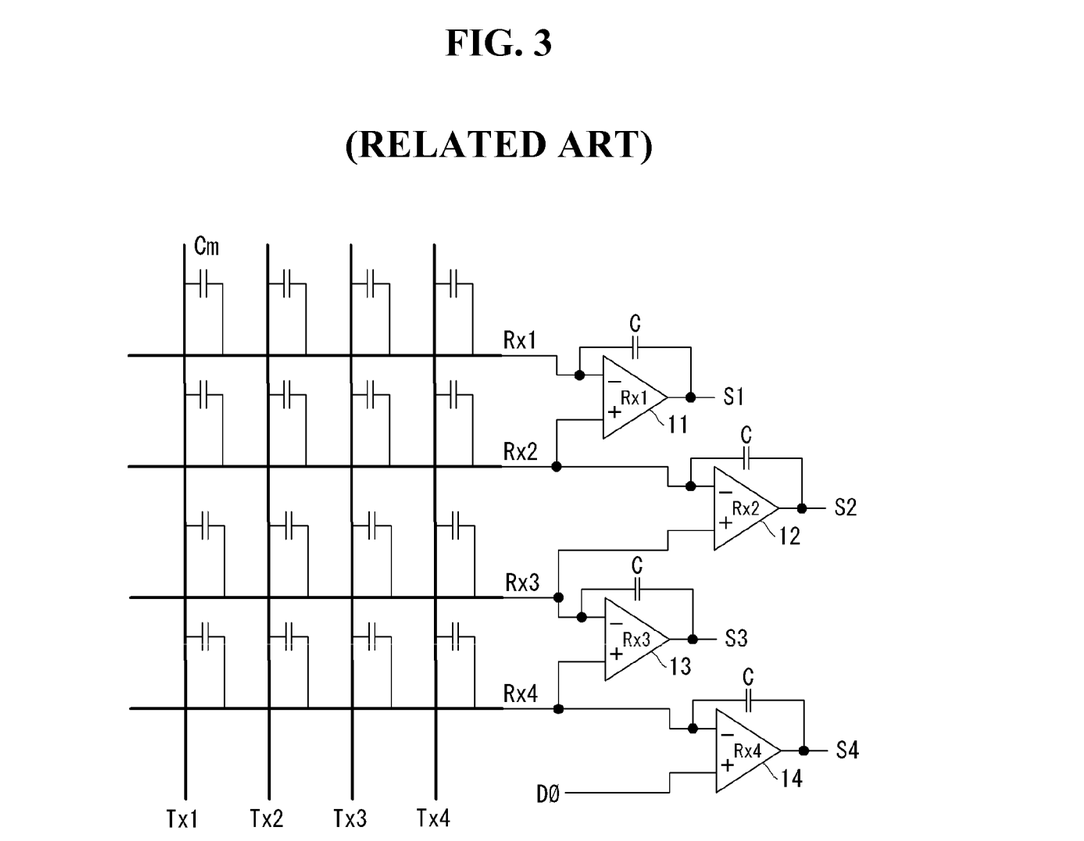
FIG. 3 is a circuit diagram showing differential amplifiers connected to Rx channels of a first touch sensing IC shown in FIG. 1.

As shown in FIGS. 1 to 3, a mutual capacitive touch screen TSP includes Tx lines Tx1 to Tx4, Rx lines Rx1 to Rx8 perpendicular to the Tx lines Tx1 to Tx4, and touch sensors formed between the Tx lines Tx1 to Tx4 and the Rx lines Rx1 to Rx8. Each touch sensor includes a mutual capacitance Cm. A touch sensing circuit supplies a driving signal to the Tx lines Tx1 to Tx4 and receives a touch sensor signal synchronized with the driving signal through the Rx lines Rx1 to Rx8. The touch sensing circuit senses a change amount of charges of the touch sensor and analyzes the change amount of charges. Hence, the touch sensing circuit decides whether or not there is a touch input and finds out a position of the touch input when there is the touch input.

In the large-sized touch screen TSP, a large number of Tx lines are used. The large-sized touch screen TSP is connected to a plurality of touch sensing integrated circuits (ICs) IC#1 and IC#2 and may be dividedly driven. The touch sensing circuit is integrated into the touch sensing ICs IC#1 and IC#2. Receiving channels (hereinafter referred to as "Rx channels") of the first touch sensing IC IC#1 are connected to the first to fourth Rx lines Rx1 to Rx4 formed on the left half of the touch screen TSP. Rx channels of the second touch sensing IC IC#2 are connected to the fifth to eight Rx lines Rx5 to Rx8 formed on the right half of the touch screen TSP.

As shown in FIGS. 2 and 3, differential amplifiers 11 to 14 may be connected to the Rx channels of the touch sensing ICs IC#1 and IC#2. An output terminal of each of the differential amplifiers 11 to 14 is connected to an inverting input terminal (−) via a capacitor C. Each of the differential amplifiers 11 to 14 amplifies a difference between an ith touch sensor signal input to the inverting input terminal (−) and an (i+1)th touch sensor signal input to a non-inverting input terminal (+) and outputs ith sensor signals S1 to S4, where 'i' is a positive integer. A noise having a similar magnitude may be applied to the adjacent touch sensors. Thus, as shown in FIG. 3, the differential amplifiers 11 to 14 amplify a difference between the signals received through the adjacent Rx lines and remove the noise. Further, the differential amplifiers 11 to 14 further increase signal components and may improve a signal-to-noise ratio (SNR).

However, a related art has the problem, in which the signal-to-noise ratio is reduced at a boundary between the touch sensing ICs IC#1 and IC#2. Signals including noises of the same magnitude have to be input to both input terminals of the differential amplifier, so as to increase the signal-to-noise ratio using the differential amplifier. As shown in FIG. 3, the differential amplifier 14 connected to the last Rx channel of each of the touch sensing ICs IC#1 and IC#2 is connected to one Rx line. The fourth Rx line Rx4 is connected to the inverting input terminal (−) of the differential amplifier 14, and a predetermined dummy signal D0 is applied to the non-inverting input terminal (+) of the differential amplifier 14. Thus, an output signal of the differential amplifier 14 includes an amplified signal component and an amplified noise component. Because of this, the signal-to-noise ratio of the touch sensors existing at a boundary between the left half and the right half of the touch screen TSP is less than the signal-to-noise ratio of the touch sensors at other positions of the touch screen TSP. As a result, as shown in FIG. 1, when the touch screen TSP is driven using the plurality of touch sensing ICs IC#1 and IC#2, it is difficult to decide the touch input in a middle portion of the touch screen TSP.

U.S. Publication No. 8,350,824 B2 disclosed a method for connecting two ICs to a large-sized touch screen and obtaining touch sensor data (hereinafter referred to as "boundary data") at a boundary between the two ICs. A sensing method disclosed in U.S. Publication No. 8,350,824 B2 proposed a method for low-pass filtering the boundary data between the ICs and data adjacent to the boundary data and generating the boundary data using a low-pass filtering value as an average value, so as to obtain the boundary data. However, the sensing method has to compare the data adjacent to the boundary data and calculate the average value of the adjacent data, so as to obtain the boundary data. Hence, a processing amount of data increases, and data processing time increases. Further, when there is a large output deviation between the ICs, the accuracy of data is reduced.

SUMMARY OF THE INVENTION

Accordingly, the present invention is directed to a touch sensing system that substantially obviates one or more of the problems due to limitations and disadvantages of the related art.

An object of the present invention is to provide a touch sensing system capable of improving a signal-to-noise ratio (SNR) at a boundary between a plurality of touch sensing integrated circuits (ICs) when the plurality of touch sensing ICs are connected to a touch screen.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a touch sensing system comprises a touch screen including touch sensors and sensing lines connected to the touch sensors, the touch sensors and the sensing lines being divided into a first sensing area and a second sensing area, a first touch sensing integrated circuit (IC) configured to sense a touch input of the first sensing area using a signal received through a plurality of receiving channels, a second touch sensing IC configured to sense a touch input of the second sensing area using a signal received through a plurality of receiving channels separated from the receiving channels of the first touch sensing IC, differential amplifiers between the sensing lines and the receiving channels of the first and second touch sensing ICs, and a switch configured to connect a sensing line, which is closest to the first sensing area among the sensing lines of the second sensing area, to an Nth differential amplifier connected to a last receiving channel of the first touch sensing IC.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

A display device according to an exemplary embodiment of the invention may be implemented based on a flat panel display, such as a liquid crystal display (LCD), a field emission display (FED), a plasma display panel (PDP), an organic light emitting display, and an electrophoresis display (EPD). In the following description, the embodiment of the invention will be described using the liquid crystal display as an example of the flat panel display. Other flat panel displays may be used.

A touch sensing system according to the embodiment of the invention may be implemented as a capacitive touch screen which senses a touch input through a plurality of capacitive sensors. The capacitive touch screen includes a plurality of touch sensors. Each touch sensor has a capacitance. The capacitance may be divided into a self capacitance and a mutual capacitance. The self capacitance is formed along a conductor line of a single layer formed in one direction. The mutual capacitance is formed between two conductor lines perpendicular to each other. In the following description, the embodiment of the invention will be described using the mutual capacitive touch screen as an example of the capacitive touch screen. Other types of capacitive touch screens may be used.

In the following description, driving signal lines for supplying a driving signal to the touch sensors of the touch screen are referred to as Tx lines; sensing lines for transmitting a touch sensor signal to a touch sensing integrated circuit (IC) are referred to as Rx lines; and receiving channels of the touch sensing IC are referred to as Rx channels. A differential amplifier is connected to the receiving channel of the touch sensing IC. A last Rx channel of the touch sensing IC is referred to as an Nth Rx channel, and a last differential amplifier connected to the Nth Rx channel is referred to as an Nth differential amplifier, where N is a positive integer equal to or greater than 2.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 4:
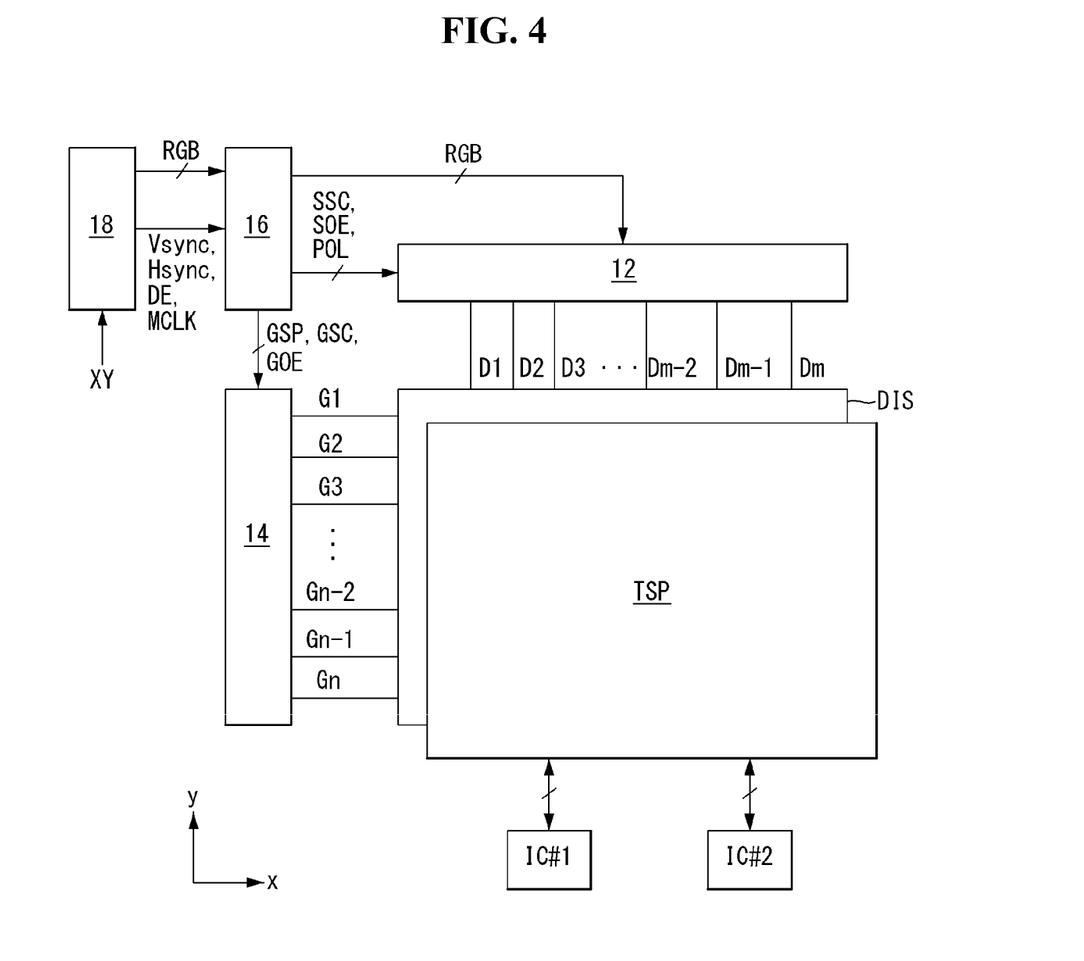
FIG. 4 is a block diagram of a touch sensing system according to an exemplary embodiment of the invention.
Figure 5:
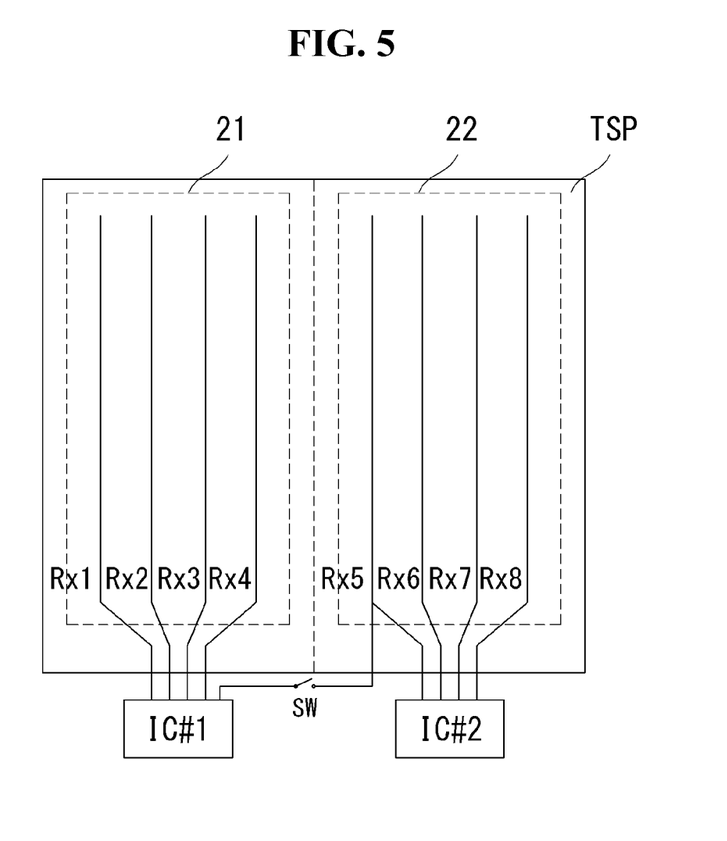
FIG. 5 shows a switch for connecting Rx lines formed in a second sensing area to a first touch sensing IC.

As shown in FIGS. 4 and 5, a touch sensing system according to the embodiment of the invention includes a touch screen TSP and a plurality of touch sensing ICs IC#1 and IC#2. The number of touch sensing ICs is not limited to FIGS. 4 and 5. The N touch sensing ICs may be connected to the touch screen TSP depending on the size or a resolution of the touch screen TSP.

The touch screen TSP includes Tx lines (not shown), Rx lines Rx1 to Rx8 crossing the Tx lines, and touch sensors Cm respectively formed at crossings of the Tx lines and the Rx lines Rx1 to Rx8. The Tx lines are driving signal lines which apply a driving signal to each of the touch sensors Cm and supply charges to the touch sensors Cm. The Rx lines Rx1 to Rx8 are sensing lines which are connected to the touch sensors Cm and supply charges of the touch sensors Cm to the touch sensing ICs IC#1 and IC#2. The Tx lines and the Rx lines Rx1 to Rx8 cross each other with an insulating layer (or a dielectric layer) interposed therebetween. The Rx lines Rx1 to Rx8 may be divided at a position crossing the Tx lines, so that the Tx lines and the Rx lines Rx1 to Rx8 are not short-circuited at the crossings of the Tx lines and the Rx lines Rx1 to Rx8. Divided portions of the Rx lines may be connected through a bridge pattern penetrated through the insulating layer. The bridge pattern crosses the Tx lines with the insulating layer interposed therebetween, and thus the Tx lines and the Rx lines are not short-circuited. A portion of the Tx line is removed at the crossings of the Tx lines and the Rx lines Rx1 to Rx8, and the divided portions of the Tx line may be connected to each other through a bridge pattern penetrated through the insulating layer.

The touch screen TSP may be attached on an upper polarizing plate of a display panel DIS or may be formed between the upper polarizing plate and an upper substrate of the display panel DIS. The touch sensors Cm of the touch screen TSP may be formed on a lower substrate of the display panel DIS along with a pixel array of the display panel DIS and may be embedded in the display panel DIS in an in-cell type.

Figure 6:
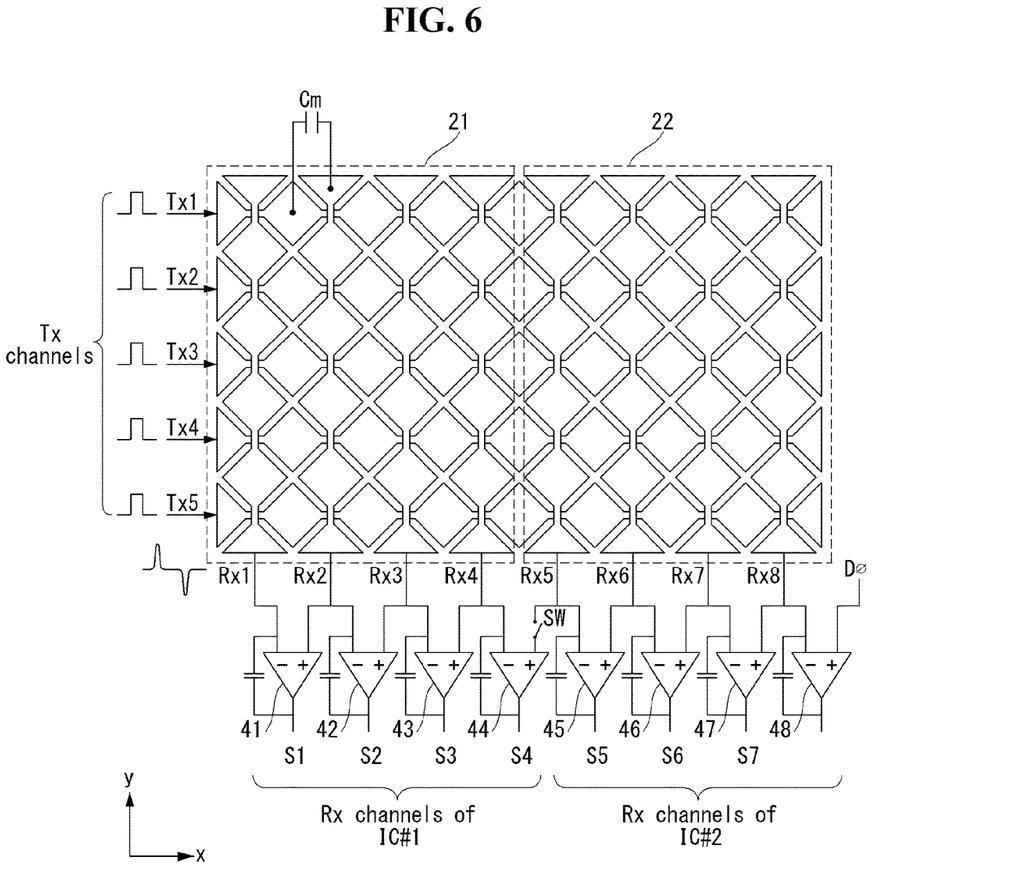
FIG. 6 is a plane view showing a connection structure between a touch screen and differential amplifiers according to a first embodiment of the invention.
Figure 7:
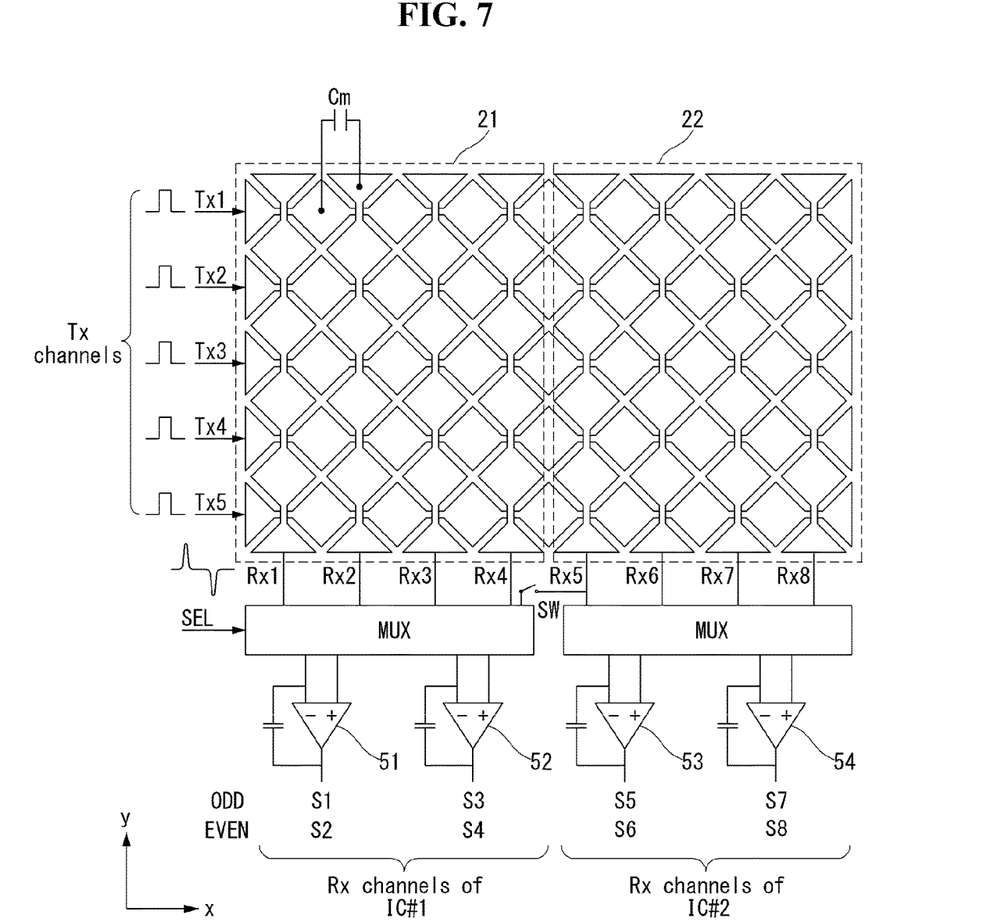
FIG. 7 is a plane view showing a connection structure between a touch screen and differential amplifiers according to a second embodiment of the invention.

The touch screen TSP is divided into a first sensing area 21, in which a touch input is sensed by the first touch sensing IC IC#1, and a second sensing area 22, in which a touch input is sensed by the second touch sensing IC IC#2. The first sensing area 21 may be the left half of the touch screen TSP, and the second sensing area 22 may be the right half of the touch screen TSP. The touch sensors Cm and the Rx lines Rx1 to Rx8 included in the touch screen TSP are divided into the first sensing area 21 and the second sensing area 22. The structure and the number of Tx lines and the structure and the number of Rx lines formed in each sensing area are not limited. In the following description, for example, the first to fourth Rx lines Rx1 to Rx4 are formed in the first sensing area 21, and the fifth to eighth Rx lines Rx5 to Rx8 are formed in the second sensing area 22. As shown in FIGS. 6 and 7, the Tx lines may be shared by the first and second sensing areas 21 and 22, or may be dividedly used in the first and second touch sensing ICs IC#1 and IC#2. A method for dividedly using the Tx lines in the sensing ICs may apply a method disclosed in U.S. Patent Publication No. US2013-0278525A1 (Oct. 24, 2013) corresponding to the present applicant, and which are hereby incorporated by reference in their entirety.

The first touch sensing IC IC#1 senses a change amount of charges before and after a touch operation of the touch sensors belonging to the first sensing area 21 and decides whether or not there is a touch input of a conductive material, such as a finger. The first touch sensing IC IC#1 finds out a position of the touch input when there is the touch input. The first touch sensing IC IC#1 supplies a driving signal to the Tx lines connected to its Tx channels and receives a touch sensor signal synchronized with the driving signal through the first to fourth Rx lines Rx1 to Rx4 and differential amplifiers.

The second touch sensing IC IC#2 senses a change amount of charges before and after a touch operation of the touch sensors belonging to the second sensing area 22 and decides whether or not there is a touch input of the conductive material, such as the finger. The second touch sensing IC IC#2 finds out a position of the touch input when there is the touch input. The second touch sensing IC IC#2 supplies the driving signal to the Tx lines connected to its Tx channels and receives a touch sensor signal synchronized with the driving signal through the fifth to eighth Rx lines Rx5 to Rx8 and differential amplifiers.

Each of the touch sensing ICs IC#1 and IC#2 includes a driving signal generator, an integrator connected to the differential amplifiers, an analog-to-digital converter (ADC), a memory, an algorithm execution unit, and the like. The driving signal generator supplies the driving signal to the touch sensors Cm through the Tx lines.

The driving signal supplied to the touch sensors Cm may be generated in various forms, such as pulses of a square wave, pulses of a sine wave, and pulses of a triangle wave. The driving signal may be supplied to each Tx line two or more times. In this instance, each touch sensor signal may be accumulated in the integrator two or more times. When charges of the touch sensor Cm are accumulated in the integrator several times, the change amount of charges of the touch sensor Cm increases as the number of accumulation operations increases. Therefore, a signal-to-noise ratio (SNR) increases. A sample & hold circuit, which samples the touch sensor signal output from the differential amplifiers and supplies the sampled touch sensor signal to the integrator, is disposed between the differential amplifiers and the integrator.

Each of the touch sensing ICs IC#1 and IC#2 converts the change amount of charges accumulated in the integrator into touch raw data using the ADC. The algorithm execution unit of each of the touch sensing ICs IC#1 and IC#2 compares the touch raw data with a predetermined threshold value and decides touch raw data greater than the predetermined threshold value as touch raw data obtained from the touch sensors of a touch input position. The algorithm execution unit calculates coordinates of the touch input position.

Figure 8:
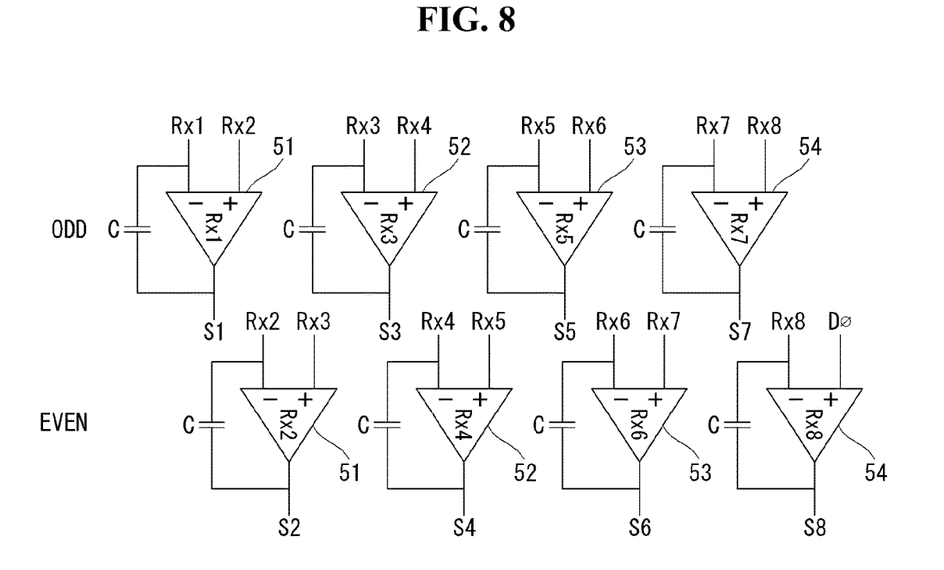
FIG. 8 shows a method for driving differential amplifiers shown in FIG. 7.

The differential amplifiers may be connected to the Rx lines Rx1 to Rx8 in the same manner as FIGS. 5 to 7. Each differential amplifier amplifies a difference between the touch sensor signals received through both input terminals of the differential amplifier. A capacitor C is connected between an inverting input terminal (−) and an output terminal of the differential amplifier. Thus, an output signal of each of differential amplifiers 41 to 48 is an amplification signal of the touch sensor input through the inverting input terminal (−). A noise adversely affecting the touch sensitivity is applied to the touch sensors Cm through a parasitic capacitance of the touch screen TSP. The parasitic capacitance of the touch screen TSP increases when the touch sensors Cm are embedded in the pixel array of the display panel DIS in the in-cell type as shown in FIG. 8. Magnitudes of the noises applied to the adjacent touch sensors Cm are almost the same. The differential amplifiers amplify a difference between the signals received through the adjacent Rx lines and further increase a signal component than the noise. Hence, the signal-to-noise ratio is improved. The differential amplifier may be implemented as a fully differential amplifier. The fully differential amplifier amplifies the difference between the signals and outputs voltages of positive and negative signals having a complementary relation through a positive output terminal and a negative output terminal.

A multiplexer (MUX) may be connected between the Rx lines Rx1 to Rx8 and the differential amplifiers, so as to reduce the number of differential amplifiers.

The touch sensing system according to the embodiment of the invention further includes a switch SW connected between an Nth differential amplifier connected to an Nth Rx channel of the first touch sensing IC IC#1 and the fifth Rx line Rx5 of the second sensing area 22. The switch SW may be embedded in the first touch sensing IC IC#1.

As shown in FIGS. 5 to 7, when the touch sensor signal is received to the Nth Rx channel of the first touch sensing IC IC#1, the switch SW connects the fifth Rx line Rx5 to a non-inverting input terminal of the Nth differential amplifier. When the switch SW is turned on, the Nth differential amplifier amplifies a difference between the fourth and fifth Rx lines Rx4 and Rx5. The switch SW is turned on only when the touch sensor signal is received to the Nth Rx channel of the first touch sensing IC IC#1, and is maintained in an off-state in other cases. The touch sensing system according to the embodiment of the invention connects the adjacent Rx lines Rx4 and Rx5 to both input terminals of the Nth differential amplifier using the switch SW, thereby increasing the signal-to-noise ratio of the touch sensors existing at a boundary between the first sensing area 21 and the second sensing area 22 of the touch screen TSP.

The display panel DIS includes a liquid crystal layer formed between the upper substrate and the lower substrate. The pixel array of the display panel DIS includes pixels formed in pixel areas defined by data lines D1 to Dm and gate lines (or scan lines) G1 to Gn, where m and n are a positive integer. Each pixel includes thin film transistors (TFTs) formed at crossings of the data lines D1 to Dm and the gate lines G1 to Gn, a pixel electrode charged to a data voltage, a storage capacitor which is connected to the pixel electrode and holds a voltage of liquid crystal cell, and the like.

Black matrixes, color filters, etc. are formed on the upper substrate of the display panel DIS. The lower substrate of the display panel DIS may be configured in a COT (color filter on TFT) structure. In this instance, the black matrixes and the color filters may be formed on the lower substrate of the display panel DIS. Common electrodes, to which a common voltage Vcom is supplied, may be formed on the upper substrate or the lower substrate of the display panel DIS. Polarizing plates are respectively attached to the upper substrate and the lower substrate of the display panel DIS. Alignment layers for setting a pre-tilt angle of liquid crystals are respectively formed on the inner surfaces contacting the liquid crystals in the upper substrate and the lower substrate of the display panel DIS. A column spacer is formed between the upper substrate and the lower substrate of the display panel DIS to keep cell gaps of the liquid crystal cells constant.

A backlight unit may be disposed under a back surface of the display panel DIS. The backlight unit may be implemented as one of an edge type backlight unit and a direct type backlight unit and irradiates light onto the display panel DIS. The display panel DIS may be implemented in any known mode including a twisted nematic (TN) mode, a vertical alignment (VA) mode, an in-plane switching (IPS) mode, a fringe field switching (FFS) mode, etc.

A display driving circuit includes a data driving circuit 12, a scan driving circuit 14, and a timing controller 16. The display driving circuit applies video data of an input image to the pixels of the display panel DIS. The data driving circuit 12 converts digital video data RGB received from the timing controller 16 into positive and negative analog gamma compensation voltages and outputs the data voltage. The data driving circuit 12 then supplies the data voltage to the data lines D1 to Dm. The scan driving circuit 14 sequentially supplies a gate pulse (or scan pulse) synchronized with the data voltage to the gate lines G1 to Gn and selects lines of the display panel DIS to which the data voltage is applied.

The timing controller 16 receives timing signals, such as a vertical sync signal Vsync, a horizontal sync signal Hsync, a data enable signal DE, and a main clock MCLK, from a host system 18. The timing controller 16 generates a data timing control signal and a scan timing control signal for respectively controlling operation timings of the data driving circuit 12 and the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, and the like.

The host system 18 may be implemented as one of a television system, a set-top box, a navigation system, a DVD player, a Blu-ray player, a personal computer (PC), a home theater system, and a phone system. The host system 18 includes a system on chip (SoC), in which a scaler is embedded, and converts the digital video data RGB of the input image into a data format suitable for displaying on the display panel DIS. The host system 18 transmits the digital video data RGB and the timing signals Vsync, Hsync, DE, and MCLK to the timing controller 16. The host system 18 runs an application associated with coordinate information (XY) received from at least any one of the touch sensing ICs IC#1 and IC#2.

FIGS. 6 to 8 show a connection structure between the touch screen and the differential amplifiers on the assumption that the number of Rx lines formed on the touch screen is eight.

As shown in FIG. 6, a first differential amplifier 41 amplifies a difference between the touch sensor signals received through the first Rx line Rx1 and the second Rx line Rx2 and supplies an amplified first touch sensor signal S1 to a first Rx channel of the first touch sensing IC IC#1. A second differential amplifier 42 amplifies a difference between the touch sensor signals received through the second Rx line Rx2 and the third Rx line Rx3 and supplies an amplified second touch sensor signal S2 to a second Rx channel of the first touch sensing IC IC#1. A third differential amplifier 43 amplifies a difference between the touch sensor signals received through the third Rx line Rx3 and the fourth Rx line Rx4 and supplies an amplified third touch sensor signal S3 to a third Rx channel of the first touch sensing IC IC#1. A fourth differential amplifier 44 amplifies a difference between the touch sensor signals received through the fourth Rx line Rx4 and the fifth Rx line Rx5 and supplies an amplified fourth touch sensor signal S4 to a fourth Rx channel of the first touch sensing IC IC#1. A fifth differential amplifier 45 amplifies a difference between the touch sensor signals received through the fifth Rx line Rx5 and the sixth Rx line Rx6 and supplies an amplified fifth touch sensor signal S5 to a first Rx channel of the second touch sensing IC IC#2. The eighth differential amplifier 48 connected to an Nth Rx channel of the second touch sensing IC IC#2 amplifies a difference between the eighth Rx line Rx8 and a predetermined dummy signal D0. An ith differential amplifier except the eighth differential amplifier 48 amplifies a difference between touch sensor signals received through an ith Rx line Rxi and an (i+1)th Rx line Rx(i+1).

The switch SW is turned on when the touch sensor signal is received to the Nth Rx channel of the first touch sensing IC IC#1. Hence, the switch SW connects the fifth Rx line Rx5 to a non-inverting input terminal (+) of the fourth differential amplifier 44.

FIGS. 7 and 8 show a connection structure between a touch screen and differential amplifiers according to a second embodiment of the invention.

As shown in FIGS. 1 and 8, the touch sensing ICs IC#1 and IC#2 each include a multiplexer MUX.

The multiplexer MUX performs a process 'ODD' for connecting ith and (i+1)th Rx lines to both input terminals of each of differential amplifiers 51 to 54 and then performs a process 'EVEN' for shifting input signals of the differential amplifiers 51 to 54 to connect (i+1)th and (i+2)th Rx lines to both input terminals of each of the differential amplifiers 51 to 54. Thus, the differential amplifiers 51 to 54 perform a process 'ODD' for amplifying a difference between touch sensor signals received through the ith and (i+1)th Rx lines to output the amplified ith touch sensor signal and then perform a process 'EVEN' for amplifying a difference between touch sensor signals received through the (i+1)th and (i+2)th Rx lines to output the amplified (i+1)th touch sensor signal.

Each of the touch sensing ICs IC#1 and IC#2 generates a selection signal for controlling the multiplexer MUX and controls the multiplexer MUX.

For a first sensing time ODD, the first Rx line Rx1 is connected to an inverting input terminal (−) of the first differential amplifier 51, and the second Rx line Rx2 is connected to a non-inverting input terminal (+) of the first differential amplifier 51. The third Rx line Rx3 is connected to an inverting input terminal (−) of the second differential amplifier 52, and the fourth Rx line Rx4 is connected to a non-inverting input terminal (+) of the second differential amplifier 52. The fifth Rx line Rx5 is connected to an inverting input terminal (−) of the third differential amplifier 53, and the sixth Rx line Rx6 is connected to a non-inverting input terminal (+) of the third differential amplifier 53. The seventh Rx line Rx7 is connected to an inverting input terminal (−) of the fourth differential amplifier 54, and the eighth Rx line Rx8 is connected to a non-inverting input terminal (+) of the fourth differential amplifier 54. Thus, the first differential amplifier 51 amplifies a difference between touch sensor signals received through the first Rx line Rx1 and the second Rx line Rx2 for the first sensing time ODD and supplies an amplified first touch sensor signal S1 to a first Rx channel of the first touch sensing IC IC#1. The second differential amplifier 52 amplifies a difference between touch sensor signals received through the third Rx line Rx3 and the fourth Rx line Rx4 for the first sensing time ODD and supplies an amplified third touch sensor signal S3 to a third Rx channel of the first touch sensing IC IC#1. The third differential amplifier 53 amplifies a difference between touch sensor signals received through the fifth Rx line Rx5 and the sixth Rx line Rx6 for the first sensing time ODD and supplies an amplified fifth touch sensor signal S5 to a first Rx channel of the second touch sensing IC IC#2. The fourth differential amplifier 54 amplifies a difference between touch sensor signals received through the seventh Rx line Rx7 and the eighth Rx line Rx8 for the first sensing time ODD and supplies an amplified seventh touch sensor signal S7 to a third Rx channel of the second touch sensing IC IC#2.

For a second sensing time EVEN, the multiplexer MUX shifts input signals of each of the differential amplifiers, and the switch SW is turned on. For the second sensing time EVEN, the second Rx line Rx2 is connected to the inverting input terminal (−) of the first differential amplifier 51, and the third Rx line Rx3 is connected to the non-inverting input terminal (+) of the first differential amplifier 51. The fourth Rx line Rx4 is connected to the inverting input terminal (−) of the second differential amplifier 52, and the fifth Rx line Rx5 is connected to the non-inverting input terminal (+) of the second differential amplifier 52. The sixth Rx line Rx6 is connected to the inverting input terminal (−) of the third differential amplifier 53, and the seventh Rx line Rx7 is connected to the non-inverting input terminal (+) of the third differential amplifier 53. The eighth Rx line Rx8 is connected to the inverting input terminal (−) of the fourth differential amplifier 54, and the predetermined dummy signal D0 is supplied to the non-inverting input terminal (+) of the fourth differential amplifier 54. Thus, the first differential amplifier 51 amplifies a difference between touch sensor signals received through the second Rx line Rx2 and the third Rx line Rx3 for the second sensing time EVEN and supplies an amplified second touch sensor signal S2 to a second Rx channel of the first touch sensing IC IC#1. The second differential amplifier 52 amplifies a difference between touch sensor signals received through the fourth Rx line Rx4 and the fifth Rx line Rx5 for the second sensing time EVEN and supplies an amplified fourth touch sensor signal S4 to a fourth Rx channel of the first touch sensing IC IC#1. The third differential amplifier 53 amplifies a difference between touch sensor signals received through the sixth Rx line Rx6 and the seventh Rx line Rx7 for the second sensing time EVEN and supplies an amplified sixth touch sensor signal S6 to a second Rx channel of the second touch sensing IC IC#2. The fourth differential amplifier 54 amplifies a difference between a touch sensor signal received through the eighth Rx line Rx8 and the dummy signal D0 for the second sensing time EVEN and supplies an amplified eighth touch sensor signal S8 to a fourth Rx channel of the second touch sensing IC IC#2.

When the touch sensors are embedded in the display panel in the in-cell type, the touch sensors are greatly affected by the driving signal of the pixels. In this instance, it is preferable, but not required, that a mutual influence between the touch sensors and the pixels is minimized by time-dividing a touch sensing period and a pixel driving period.

Figure 9:
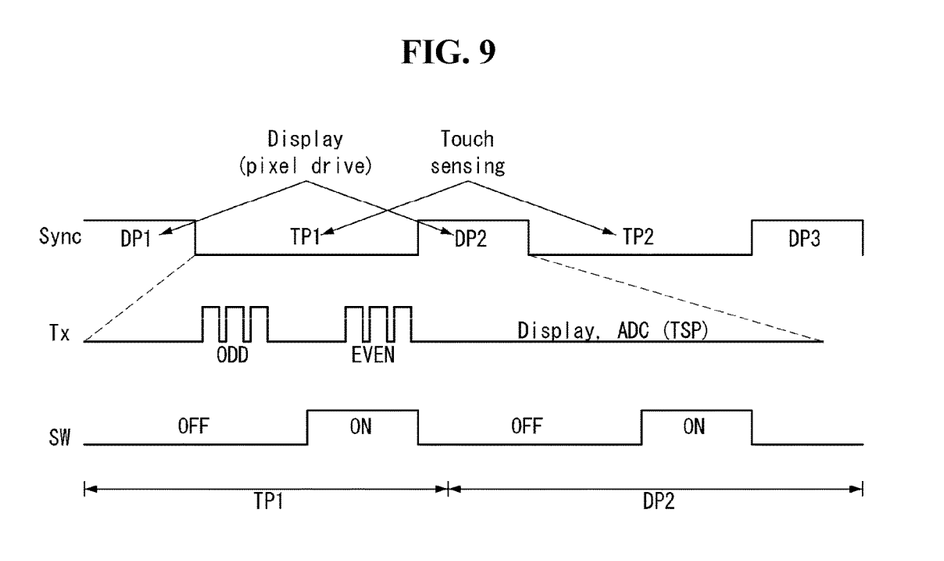
FIG. 9 is a waveform diagram showing a method for driving differential amplifiers shown in FIG. 8.

FIG. 9 is a waveform diagram showing a method for driving the differential amplifiers shown in FIG. 8.

As shown in FIG. 9, one frame period is time-divided into one or more pixel driving periods DP1 and DP2 and one or more touch sensing periods TP1 and TP2. During the pixel driving periods DP1 and DP2, data of the input image is applied to the pixels. Each of the touch sensing periods TP1 and TP2 is divided into first and second sensing periods ODD and EVEN.

The data applied to the pixels is held during the touch sensing periods TP1 and TP2. Each of the touch sensing ICs IC#1 and IC#2 is driven and senses a touch input during the touch sensing periods TP1 and TP2, and is on standby during the pixel driving periods DP1 and DP2. The pixel driving periods DP1 and DP2 and the touch sensing periods TP1 and TP2 may be alternately arranged.

The timing controller 16 may generate a sync signal Sync defining the pixel driving periods DP1 and DP2 and the touch sensing periods TP1 and TP2 based on the vertical sync signal Vsync. Each of the touch sensing ICs IC#1 and IC#2 may be synchronized with the display driving circuits 12 and 14 in response to the sync signal Sync. A high logic period of the sync signal Sync may define the pixel driving periods DP1 and DP2, and a low logic period of the sync signal Sync may define the touch sensing periods TP1 and TP2, and vice versa.

The switch SW is turned on during a second sensing period EVEN and connects the fifth Rx line Rx5 to the non-inverting input terminal (+) of the fourth differential amplifier 54. The fourth Rx line Rx4 connected to the inverting input terminal (−) of the fourth differential amplifier 54 is positioned at a right end of the first sensing area 21, and the fifth Rx line Rx5 connected to the non-inverting input terminal (+) of the fourth differential amplifier 54 is positioned at a left end of the second sensing area 22. Thus, the adjacent Rx lines Rx4 and Rx5 are connected to both input terminals (−) and (+) of the fourth differential amplifier 54. As a result, when the two or more touch sensing ICs are connected to the touch screen, the embodiment of the invention may improve the signal-to-noise ratio at a boundary between the touch sensing ICs.

The change amount of charges of the touch sensors obtained from the output of the differential amplifiers during the touch sensing periods TP1 and TP2 may be converted into the touch raw data through the ADC during the pixel driving periods DP1 and DP2. The embodiment of the invention parallel-processes an operation for applying the video data to the pixels in the pixel driving periods DP1 and DP2 and an ADC driving operation of the touch sensing ICs IC#1 and IC#2, thereby increasing the touch sensing period. Further, an ADC driving time may be sufficiently secured.

As described above, the embodiment of the invention includes the switch connecting the sensing lines existing at a boundary between the plurality of touch sensing ICs when the plurality of touch sensing ICs are connected to the touch screen, and may improve the signal-to-noise ratio received from the touch sensors existing at the boundary using the switch.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system, comprising:
a touch screen including touch sensors and sensing lines connected to the touch sensors, the touch sensors and the sensing lines being divided into a first sensing area and a second sensing area;
a first touch sensing integrated circuit (IC) configured to sense a touch input of the first sensing area using a signal received through a plurality of channels;
a second touch sensing IC configured to sense a touch input of the second sensing area using a signal received through a plurality of channels separated from the channels of the first touch sensing IC;
differential amplifiers between the sensing lines and the channels of the first and second touch sensing ICs; and
a switch configured to connect a (N+1)th sensing line, which is closest to the first sensing area among the sensing lines of the second sensing area, to an Nth differential amplifier connected to a last channel of the first touch sensing IC,
wherein a non-inverting input terminal of the Nth differential amplifier is connected to the (N+1)th sensing line through the switch,
wherein an inverting input terminal of the Nth differential amplifier is directly connected to a Nth sensing line, which is closest to the second sensing area among the sensing lines of the first sensing area, and
wherein the switch is turned on when a touch sensor signal on the Nth sensing line is received to a Nth channel of the first touch sensing IC, and is maintained in an off-state in other cases.

2. The touch sensing system of claim 1, further comprising a multiplexer configured to shift sensing lines connected to input terminals of the differential amplifiers.

3. The touch sensing system of claim 2, wherein the multiplexer connects ith (where 'i' is a positive integer) and (i+1)th sensing lines to both input terminals of each differential amplifier for a first sensing time and then shifts input signals of the differential amplifiers to connect (i+1)th and (i+2)th Rx lines to both input terminals of each differential amplifier for a second sensing time.

4. The touch sensing system of claim 3, wherein each differential amplifier outputs an odd-numbered touch sensor signal for the first sensing time,
wherein each differential amplifier outputs an even-numbered touch sensor signal for the second sensing time,
wherein the switch is turned on for the second sensing time and connects the (N+1)th sensing line , which is closest to the first sensing area among the sensing lines of the second sensing area, to the non-inverting input terminal of the Nth differential amplifier, and
wherein the sensing line, which is closest to the second sensing area among the sensing lines of the first sensing area, is connected to the inverting input terminal of the Nth differential amplifier for the second sensing time,
wherein the first sensing line is positioned at a left end of the second sensing area, and
wherein the second sensing line is positioned at a right end of the first sensing area.

5. The touch sensing system of claim 4, wherein for the first sensing time, a first differential amplifier amplifies a difference between a signal of a first sensing line input to an inverting input terminal and a signal of a second sensing line input to a non-inverting input terminal, generates a first touch sensor signal, and supplies the first touch sensor signal to a first channel of the first touch sensing IC,
wherein for the first sensing time, a second differential amplifier amplifies a difference between a signal of a third sensing line input to an inverting input terminal and a signal of a fourth sensing line input to a non-inverting input terminal, generates a third touch sensor signal, and supplies the third touch sensor signal to a third channel of the first touch sensing IC,
wherein for the first sensing time, a third differential amplifier amplifies a difference between a signal of a fifth sensing line input to an inverting input terminal and a signal of a sixth sensing line input to a non-inverting input terminal, generates a fifth touch sensor signal, and supplies the fifth touch sensor signal to a first channel of the second touch sensing IC,
wherein for the first sensing time, a fourth differential amplifier amplifies a difference between a signal of a seventh sensing line input to an inverting input terminal and a signal of an eighth sensing line input to a non-inverting input terminal, generates a seventh touch sensor signal, and supplies the seventh touch sensor signal to a third channel of the second touch sensing IC,
wherein for the second sensing time, the first differential amplifier amplifies a difference between a signal of the second sensing line input to the inverting input terminal and a signal of the third sensing line input to the non-inverting input terminal, generates a second touch sensor signal, and supplies the second touch sensor signal to a second channel of the first touch sensing IC,
wherein for the second sensing time, the second differential amplifier amplifies a difference between a signal of the fourth sensing line input to the inverting input terminal and a signal of the fifth sensing line input to the non-inverting input terminal, generates a fourth touch sensor signal, and supplies the fourth touch sensor signal to a fourth channel of the first touch sensing IC,
wherein for the second sensing time, the third differential amplifier amplifies a difference between a signal of the sixth sensing line input to the inverting input terminal and a signal of the seventh sensing line input to the non-inverting input terminal, generates a sixth touch sensor signal, and supplies the sixth touch sensor signal to a second channel of the second touch sensing IC,
wherein for the second sensing time, the fourth differential amplifier amplifies a difference between a signal of the eighth sensing line input to the inverting input terminal and a predetermined dummy signal input to the non-inverting input terminal, generates an eighth touch sensor signal, and supplies the eighth touch sensor signal to a fourth channel of the second touch sensing IC.

6. The touch sensing system of claim 5, wherein one frame period is time-divided into one or more pixel driving periods and one or more touch sensing periods,
   wherein each touch sensing period is divided into the first sensing time and the second sensing time, and
   wherein a change amount of charges of the touch sensors obtained from the output of the differential amplifiers during the touch sensing periods is converted into touch raw data during the pixel driving periods.

7. The touch sensing system of claim 1, wherein the switch is embedded in the first touch sensing IC.

8. A touch sensing system, comprising:
   a touch screen including touch sensors and sensing lines connected to the touch sensors, the touch sensors and the sensing lines being divided into a first sensing area and a second sensing area;
   a first touch sensing integrated circuit (IC) configured to sense a touch input of the first sensing area using a signal received through a plurality of channels;
   a second touch sensing IC configured to sense a touch input of the second sensing area using a signal received through a plurality of channels separated from the channels of the first touch sensing IC;
   differential amplifiers between the sensing lines and the channels of the first and second touch sensing ICs; and
   a switch configured to connect a (N+1)th sensing line, which is closest to the first sensing area among the sensing lines of the second sensing area, to an Nth differential amplifier connected to a last channel of the first touch sensing IC,
   wherein other differential amplifiers except for the Nth differential amplifier are directly connected to the sensing lines, and
   wherein the switch is turned on when a touch sensor signal on the Nth sensing line is received to a Nth channel of the first touch sensing IC, and is maintained in an off-state in other cases.

9. The touch sensing system of claim 8, wherein a non-inverting input terminal of the Nth differential amplifier is connected to the sensing line, which is closest to the first sensing area among the sensing lines of the second sensing area, through the switch, and
   an inverting input terminal of the Nth differential amplifier is directly connected to a sensing line, which is closest to the second sensing area among the sensing lines of the first sensing area.

10. The touch sensing system of claim 8, further comprising a multiplexer configured to shift sensing lines connected to input terminals of the differential amplifiers.

11. The touch sensing system of claim 10, wherein the multiplexer connects ith (where 'i' is a positive integer) and (i+1)th sensing lines to both input terminals of each differential amplifier for a first sensing time and then shifts input signals of the differential amplifiers to connect (i+1)th and (i+2)th Rx lines to both input terminals of each differential amplifier for a second sensing time.

12. The touch sensing system of claim 11, wherein each differential amplifier outputs an odd-numbered touch sensor signal for the first sensing time,
   wherein each differential amplifier outputs an even-numbered touch sensor signal for the second sensing time,
   wherein the switch is turned on for the second sensing time and connects the sensing line, which is closest to the first sensing area among the sensing lines of the second sensing area, to the non-inverting input terminal of the Nth differential amplifier, and
   wherein the sensing line, which is closest to the second sensing area among the sensing lines of the first sensing area, is connected to the inverting input terminal of the Nth differential amplifier for the second sensing time,
   wherein the first sensing line is positioned at a left end of the second sensing area, and
   wherein the second sensing line is positioned at a right end of the first sensing area.

13. The touch sensing system of claim 12, wherein for the first sensing time, a first differential amplifier amplifies a difference between a signal of a first sensing line input to an inverting input terminal and a signal of a second sensing line input to a non-inverting input terminal, generates a first touch sensor signal, and supplies the first touch sensor signal to a first channel of the first touch sensing IC,
   wherein for the first sensing time, a second differential amplifier amplifies a difference between a signal of a third sensing line input to an inverting input terminal and a signal of a fourth sensing line input to a non-inverting input terminal, generates a third touch sensor signal, and supplies the third touch sensor signal to a third channel of the first touch sensing IC,
   wherein for the first sensing time, a third differential amplifier amplifies a difference between a signal of a fifth sensing line input to an inverting input terminal and a signal of a sixth sensing line input to a non-inverting input terminal, generates a fifth touch sensor signal, and supplies the fifth touch sensor signal to a first channel of the second touch sensing IC,
   wherein for the first sensing time, a fourth differential amplifier amplifies a difference between a signal of a seventh sensing line input to an inverting input terminal and a signal of an eighth sensing line input to a non-inverting input terminal, generates a seventh touch sensor signal, and supplies the seventh touch sensor signal to a third channel of the second touch sensing IC,
   wherein for the second sensing time, the first differential amplifier amplifies a difference between a signal of the second sensing line input to the inverting input terminal and a signal of the third sensing line input to the non-inverting input terminal, generates a second touch sensor signal, and supplies the second touch sensor signal to a second channel of the first touch sensing IC,
   wherein for the second sensing time, the second differential amplifier amplifies a difference between a signal of the fourth sensing line input to the inverting input terminal and a signal of the fifth sensing line input to the non-inverting input terminal, generates a fourth touch sensor signal, and supplies the fourth touch sensor signal to a fourth channel of the first touch sensing IC,
   wherein for the second sensing time, the third differential amplifier amplifies a difference between a signal of the sixth sensing line input to the inverting input terminal and a signal of the seventh sensing line input to the non-inverting input terminal, generates a sixth touch sensor signal, and supplies the sixth touch sensor signal to a second channel of the second touch sensing IC,
   wherein for the second sensing time, the fourth differential amplifier amplifies a difference between a signal of the eighth sensing line input to the inverting input terminal and a predetermined dummy signal input to the non-inverting input terminal, generates an eighth touch sensor signal, and supplies the eighth touch sensor signal to a fourth channel of the second touch sensing IC.

14. The touch sensing system of claim 13, wherein one frame period is time-divided into one or more pixel driving periods and one or more touch sensing periods,
- wherein each touch sensing period is divided into the first sensing time and the second sensing time, and
- wherein a change amount of charges of the touch sensors obtained from the output of the differential amplifiers during the touch sensing periods is converted into touch raw data during the pixel driving periods.

15. The touch sensing system of claim 8, wherein the switch is embedded in the first touch sensing IC.

\* \* \* \* \*